(No Model.) 2 Sheets—Sheet 2.
J. C. SCHUMAN.
METHOD OF PREPARING AND TREATING STARCH.
No. 318,307. Patented May 19, 1885.
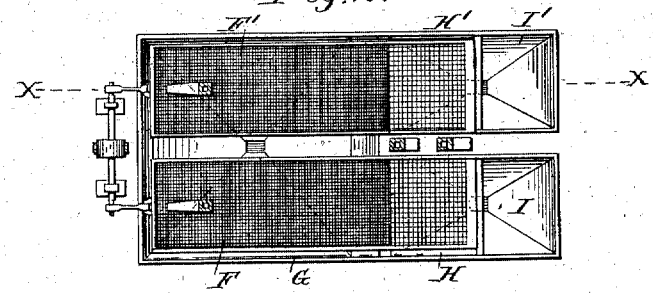
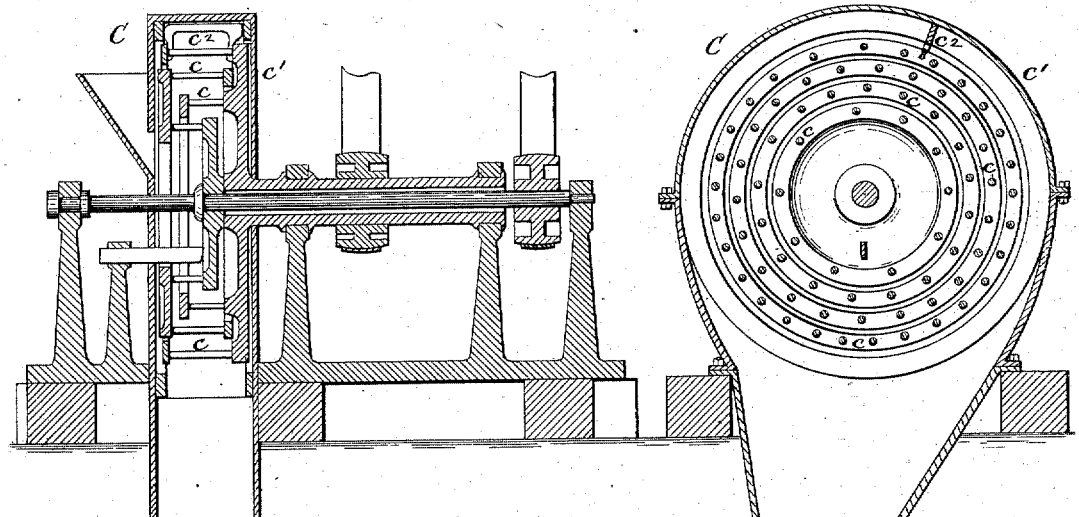
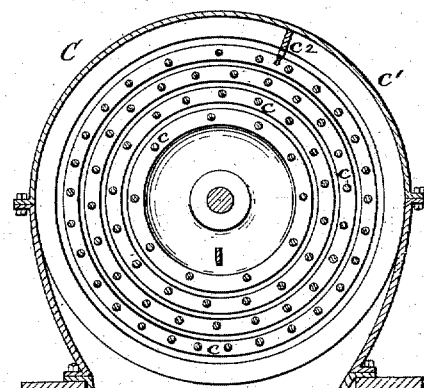
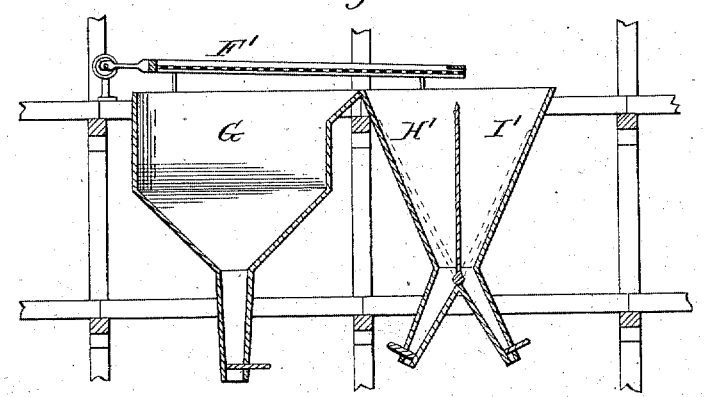

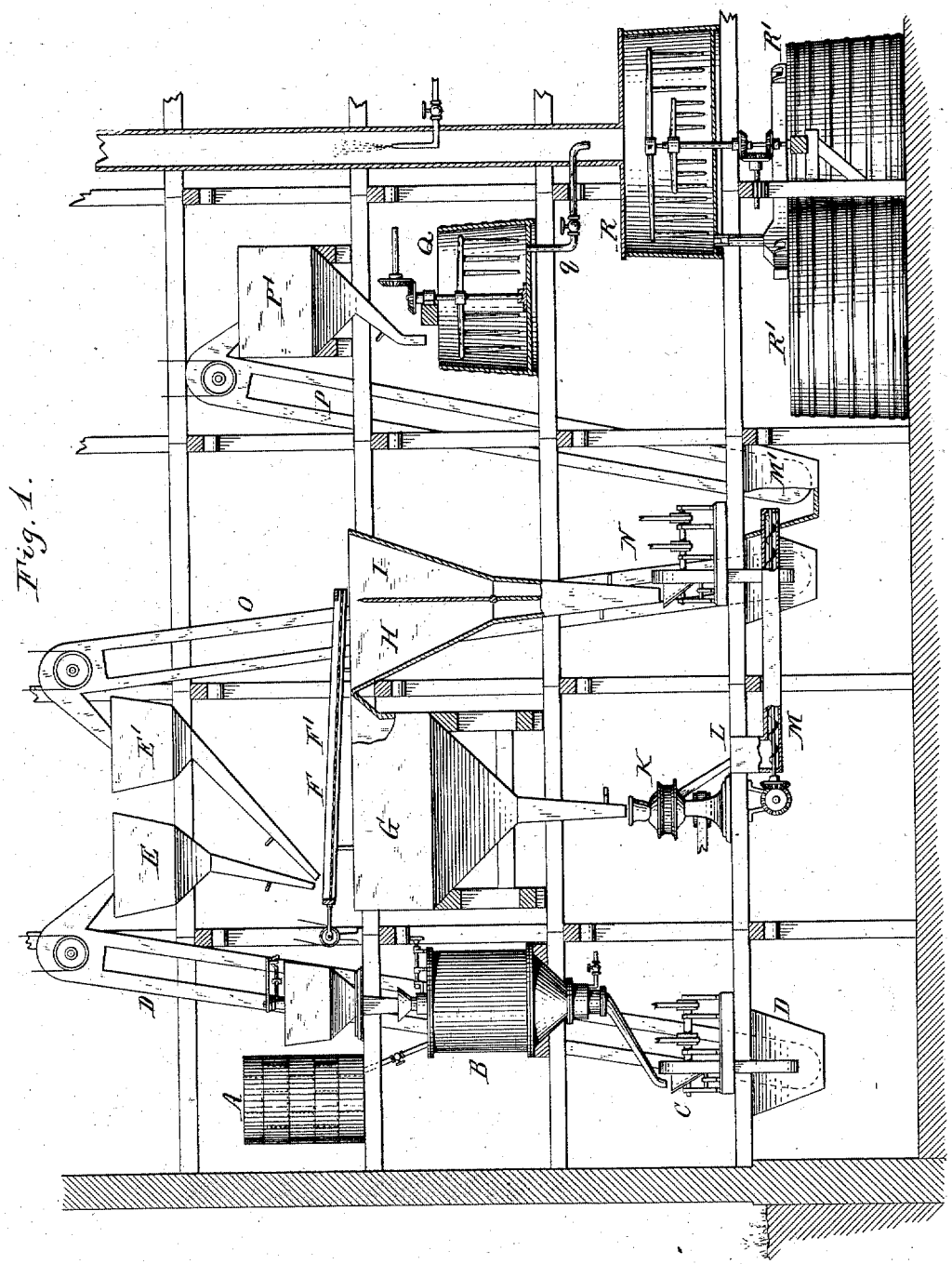

UNITED STATES PATENT OFFICE.

JOHN C. SCHUMAN, OF AKRON, ASSIGNOR TO WILLIAM T. JEBB, OF BUFFALO, NEW YORK.

METHOD OF PREPARING AND TREATING STARCH.

SPECIFICATION forming part of Letters Patent No. 318,307, dated May 19, 1885.

Application filed April 22, 1885. (No specimens.)

*To all whom it may concern:*

Be it known that I, JOHN C. SCHUMAN, of Akron, in the county of Erie and State of New York, have invented new and useful Improvements in the Method of Preparing and Treating Starch, of which the following is a specification.

This invention relates to an improvement in the treatment of Indian corn or maize for extracting the starch therefrom, and for producing a mash suitable for the manufacture of distilled spirits. A kernel of Indian corn consists of three principal parts—viz., the inner portion or body, which consists, principally, of starch-shells, the outer inclosing-hull and its glutinous lining, which consists of wood fiber, nitrogenous compounds, albumen, and oil, which are useful for cattle-feed, and the germ or chit, which is very rich in oil.

In manufacturing distilled spirits from Indian corn it has been heretofore and it is now the general practice to crush or grind the grain and to mash, ferment, and distill all these constituent parts of the crushed or ground grain together, whereby a large amount of impurities contained in or emanating from the hulls and germs are mixed with the spirits, from which they must be afterward removed, partly by rectification, and in the case of the more volatile impurities—such as fusel-oil—by the slow process of aging. It has also been customary in some localities to strain the mash before fermenting, thereby removing the hulls and other coarse particles from the wort or liquid to be fermented, whereby said objectionable results are to a certain extent avoided, without, however, avoiding the effects of the more finely-reduced portions of the hulls and germs which cannot be strained out, and of the oily ingredients which have become mixed with the liquid, and which will produce the above-mentioned difficulties. It has also been proposed to manufacture distilled spirits from starch made in the usual manner; but this is impracticable, because such starch is very expensive, and the impossibility of thoroughly eliminating all traces of alkali used in the process of manufacture renders it impossible to obtain the requisite yield of spirit.

The object of this invention is to avoid these difficulties by thoroughly removing the hulls and germs from the starch-granules before mashing the starch; and my invention consists of the improvements, which will be hereinafter fully set forth, and pointed out in the claims.

In the accompanying drawings, consisting of two sheets, Figure 1 is a sectional elevation of a plant of machinery by which my invention can be practiced. Fig. 2 is a top plan view of the separating-sieves. Figs. 3 and 4 are sectional elevations of the reducing-machine at right angles to each other. Fig. 5 is a vertical section in line $x$ $x$, Fig. 2.

Like letters of reference refer to like parts in the several figures.

A represents a water-tank, which contains hot water used for steeping the corn.

B represents a tank or vat in which the corn is steeped, and which is supplied with water from the tank A, and constructed with a perforated false bottom for draining. The corn is steeped in this tank at a temperature of about 140° Fahrenheit for about fifteen hours, whereby the grain becomes expanded or swelled. This temperature is maintained in the steeping-tank by renewing the water from time to time. When the corn has been steeped, the starchy body of each kernel has become enlarged and soft, the germ has become similarly enlarged, and tends to separate itself, by reason of its oily character, from the surrounding portions of the starchy body which has absorbed water, and the hull has become tough and tends to separate, together with its glutinous lining, from the starchy body and oily germ. In steeping the corn, care is taken that the temperature does not rise to 155° Fahrenheit, at which temperature the sacks of the starch-cells begin to burst and discharge their contents. When the corn has been steeped, the warm water is drained off and cold water is introduced into the tank B, whereby the corn is chilled and the hulls are further toughened and the oily germs further loosened from the surrounding portions of the starchy bodies. The water is then drained off from the corn in the tank B.

C represents a reducing-machine, which receives the steeped corn from the tank B, and in which the grain is whipped or beaten, whereby the hulls and their glutinous linings are opened and stripped in large flakes from the inner starchy bodies and from the germs, the starchy bodies being at the same time reduced to fine granules, while the germs are detached from the starchy portions and hulls without being pulverized. The reducing-machine C consists of several concentric rows of beaters, $c$, revolving at a high speed in opposite directions within an inclosing-case, $c'$.

In order to facilitate the discharge of the material from this machine, the outer row of beaters is provided with one or more scrapers, $c^2$, which prevent the material from adhering to the inner side of the inclosing-case of the machine. The reduced material is discharged from the reducing-machine C into the foot of an elevator, D, whereby it is conducted to a receiving-hopper, E.

F represents a separating-screen, which receives the reduced material from the hopper E and separates the same into three products—viz., the fine fragments or granules of crude starch, the germs which are somewhat larger in size, and the flakes of hulls and glutinous linings which are still larger. To this end the screen is clothed for about two-thirds of its length from its head with fine wire-cloth, which permits only the starch-granules to pass through, and for the remainder of its length with coarse wire-cloth, which permits the germs to pass through, while the hulls or coarse offal escape over the tail of the screen.

G represents a receiver which collects the starchy material which passes through the upper finely-clothed portion of the screen.

H represents a receiver which collects the germs passing through the lower coarsely-clothed portion of the screen, and I is a receiver which collects the hulls escaping over the tail of the screen.

K represents a reducing-mill, which receives the material from the receiver G, and in which the material is further reduced to a higher degree of fineness, if desired. The mill preferably employed for this purpose is known as the "Bogardus mill," and consists, essentially, of two serrated or grooved disks having a slight eccentric movement with reference to each other, whereby the gumming or clogging of the disks by the material is avoided.

L is a receiver, which receives the ground material from the mill K; and M is a conveyer whereby the ground material is conducted to a receiver, M', from which it is elevated by an elevator, P, to a receiving-hopper, P'.

N is a supplementary reducing-machine, constructed like the machine C, in which the steeped grain is reduced, and receiving the hulls and germs, either or both, from the hoppers H and I, for the purpose of detaching from these products of the separation any starchy particles which may adhere to the same, if such further treatment is necessary or desirable. The reduced material coming from the machine N is conducted by an elevator, O, into a hopper, E', from which it is spouted upon a separating-screen, F', which is arranged on one side of the screen F, and which effects a separation of the detached meal from the germs and hulls, the meal passing into the receiver G and the germs and hulls into receivers H' and I'.

R represents a mash-tub in which the starch is mashed and heated, preferably, to a temperature of 190° to 205° Fahrenheit, which is maintained until the starch-cells are well broken, when the temperature is reduced to about 150° Fahrenheit, at which temperature the rye is introduced. The mash is then further cooled to about 140° Fahrenheit, when the malt is added, and this temperature is maintained until a proper conversion has taken place, when the mash is further cooled to the temperature required for setting in the fermenters. The starch is delivered into the mash-tub R either in the condition in which it comes from the sieves, or, if preferred, it may first be mixed with water and reduced to a liquid in an agitating-tub, Q, and then be conducted from said tub by a pipe, $q$, to the mash-tub R, in which the starch-liquid is then mashed by the addition of malt and rye, or malt alone, as may be preferred.

R' represents the fermenting-tubs which receive the mash from the mash-tub R, and in which the mash is fermented by the addition of yeast. The fermented beer derived from the fermenting-tubs R' is distilled in a still of any suitable construction.

The starch-meal which is mashed and fermented consists of the starchy portions of the kernels freed from the hulls and germs, whereby the process of mashing is greatly facilitated and rendered uniformly effective in converting all of the starch-granules, and whereby the liberation of fusel-oil or other impurities is to a large extent avoided, thereby producing purer spirits than heretofore, while preserving the separated hulls and germs in a comparatively dry condition, in which they can be readily utilized as feed for cattle, &c., and enabling the process to be conducted with a smaller expenditure of power and heat than heretofore.

It is obvious that the apparatus may be changed in its arrangement as circumstances may require.

I claim as my invention—

1. The herein-described method of preparing the mash, which consists in steeping the corn, then detaching the hulls and germs from the starchy portions of the kernels by whipping or beating without additional water, then separating the hulls and germs from the starch-meal by sifting, and then mashing the starch meal under the pressure of the atmosphere, substantially as set forth.

2. The herein-described method of preparing the mash, which consists in steeping the corn, then detaching the hulls and germs from the starchy portions of the kernels by whipping or beating without additional water, then separating the hulls and germs from the starch-meal by sifting, then reducing the starch-meal to a liquid by mixing it with water, and then mashing the starch-liquid, substantially as set forth.

Witness my hand this 20th day of April, 1885.

J. C. SCHUMAN.

Witnesses:
S. B. GOODALE.
E. W. HOAGLAND.

It is hereby certified that in Letters Patent No. 318,307, granted May 19, 1885, upon the application of John C. Schuman, of Akron, New York, for an improvement in the "Method of Preparing and Treating Starch," an error appears in the printed specification requiring correction, as follows: In line 15, page 1, the compound word "starch-shells" should read *starch cells;* and that the Letters Patent should be read with this correction therein to make it conform to the record of the case in the Patent Office.

Signed, countersigned, and sealed this 2d day of June, A. D. 1885.

[SEAL.]

H. L. MULDROW,
*Acting Secretary of the Interior.*

Countersigned:
    ROBT. B. VANCE,
        *Acting Commissioner of Patents.*